W. H. WHETSTONE.
Cotton-Planter.
No. 219,548.        Patented Sept. 9, 1879.
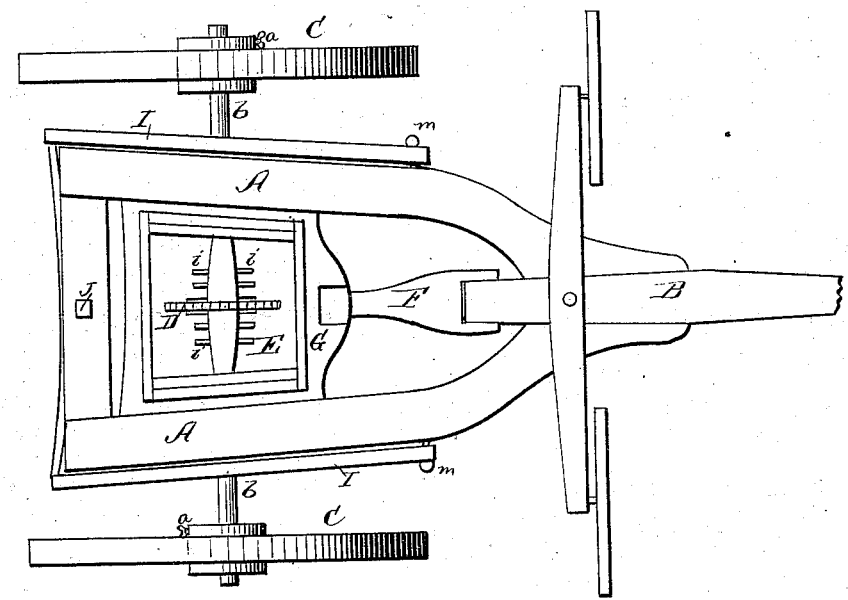
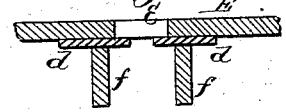
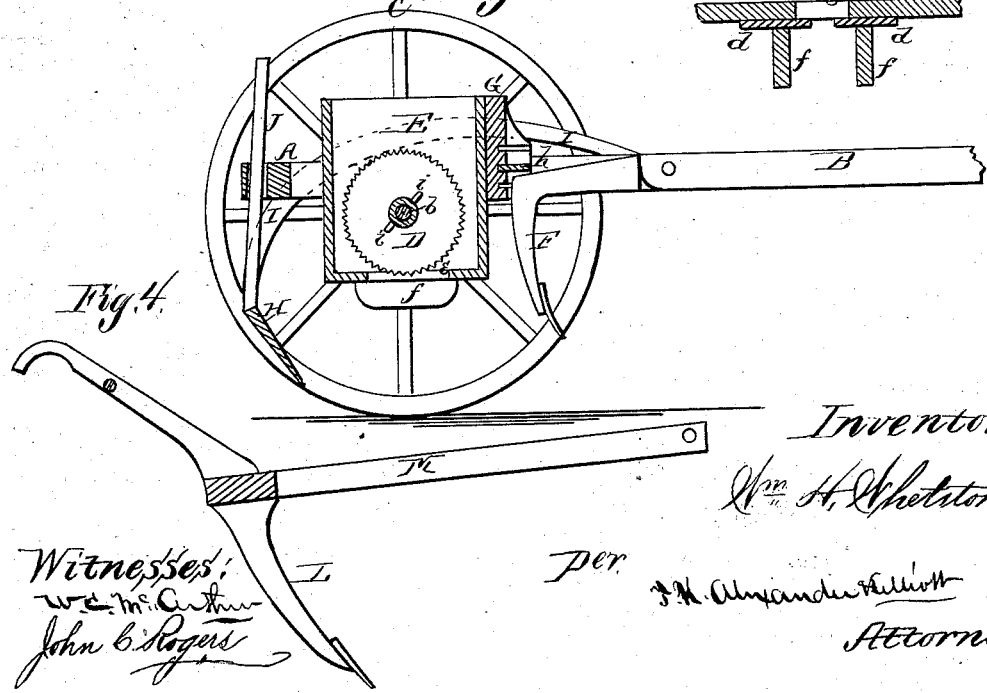

UNITED STATES PATENT OFFICE.

WILLIAM H. WHETSTONE, OF LOWNDESBOROUGH, ALABAMA.

IMPROVEMENT IN COTTON-PLANTERS.

Specification forming part of Letters Patent No. 219,548, dated September 9, 1879; application filed July 18, 1879.

*To all whom it may concern:*

Be it known that I, WILLIAM H. WHETSTONE, of Lowndesborough, in the county of Lowndes and State of Alabama, have invented certain new and useful Improvements in Cotton-Planters; and I do hereby declare that the following is a full, clear, and exact description thereof, reference being had to the accompanying drawings, and to the letters of reference marked thereon, which form a part of this specification.

The nature of my invention consists in the construction and arrangement of a cotton-seed planter, as will be hereinafter more fully set forth.

In order to enable others skilled in the art to which my invention appertains to make and use the same, I will now proceed to describe its construction and operation, referring to the annexed drawings, in which—

Figure 1 is a plan view; Fig. 2, a central section; and Figs. 3 and 4 are details of parts of my invention.

A represents a light frame-work, to which the tongue B is attached, said tongue being provided with the usual neck-yoke, double and single trees for the attachment of two horses to draw the machine. The horses walk in the furrows on each side of the row. The wheels C C also are made to roll in the furrows, and are adjustable to different widths by means of set-screws $a$. After being adjusted, the wheels are fastened on the axle $b$ by said set-screws. In the center of the axle $b$ is secured a circular saw, D, which draws the cotton-seed through a slot, $e$, in the seed-box E and empties it in the furrow made by the plow F in front of the box. On each side of the slot $e$, to the bottom of the box, is attached a laterally movable or adjustable slide, $d$, to regulate the quantity of seed sown. These movable slides are confined in place by means of wooden strips or flanges $f\,f$, fastened to the box by screws. These strips or flanges also act to prevent the seed from being blown by the wind and compel the seed to fall in the furrow. On each side of the saw D, to the axle $b$, are attached fingers $i$, to agitate and stir the seed, so that the saw can easily carry it through the slot.

The plow F in front is made adjustable to any required depth, the front end of the plow-beam being hinged to rear end of tongue, and the rear end of the plow-beam works in a vertical groove in a block, G, fastened in the frame at the front of the box. This block is also formed with a series of horizontal grooves at intervals of one or two inches, and a metal plate, $h$, is placed in the horizontal groove, necessary to give the proper depth to the plow, which can be changed at will by placing said plate in different grooves.

The coverer consists of a board, H, two rigidly-curved arms, I I, and handle J, said handle passing loosely through a mortise in rear cross-bar of frame, so as to allow the board to play up and down at will on rough ground, and any additional weight necessary to apply is done with the hand on said handle. The forward ends of the curved arm I are pivoted to the sides of the frame by set-screws $m$. These screws are taken out for detaching the board when required, and in its stead is placed the double foot-plow L, the beams M of said plow having holes for their attachment to the frame, the same as the arms I. The cotton may be covered either by the board or with this plow. When the cotton comes up these plows are taken off and right-and-left half-shovels are put on to bar the cotton.

The plows L may be laterally adjustable, so that different distances may be obtained to adapt them for the use of any plantation as a cultivator.

Having thus fully described my invention, what I claim as new, and desire to secure by Letters Patent, is—

1. The combination of the hinged plow-beam F, the block G, having a central vertical groove and a series of horizontal grooves, and the plate $h$, substantially as and for the purposes herein set forth.

2. The combination, in a seeding-machine, of the slotted box E, having slides $d\,d$, and strips or flanges $f\,f$, all as and for the purposes set forth.

In testimony that I claim the foregoing as my own I affix my signature in presence of two witnesses.

W. H. WHETSTONE.

Witnesses:
    LOWNDES WHETSTONE,
    E. GEIGER.